US008254685B2

United States Patent
Greene et al.

(10) Patent No.: US 8,254,685 B2
(45) Date of Patent: Aug. 28, 2012

(54) DETECTING CONTENT CHANGE IN A STREAMING IMAGE SYSTEM

(75) Inventors: David Perry Greene, Austin, TX (US); Szymon Swistun, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 627 days.

(21) Appl. No.: 12/057,320

(22) Filed: Mar. 27, 2008

(65) Prior Publication Data

US 2008/0175504 A1 Jul. 24, 2008

Related U.S. Application Data

(63) Continuation of application No. 11/191,576, filed on Jul. 28, 2005, now abandoned.

(51) Int. Cl.
*G06K 9/00* (2006.01)

(52) U.S. Cl. ........ 382/181; 382/239; 348/700; 709/231; 709/247

(58) Field of Classification Search .................. 382/239, 382/251, 181; 709/231, 247, 203, 217; 348/700
See application file for complete search history.

(56) References Cited

U.S. PATENT DOCUMENTS

| | | | |
|---|---|---|---|
| 5,396,284 A | 3/1995 | Freeman | |
| 5,623,424 A | 4/1997 | Azadegan et al. | |
| 5,708,767 A | 1/1998 | Yeo et al. | |
| 5,930,398 A | 7/1999 | Watney | |
| 6,243,497 B1 | 6/2001 | Chiang et al. | |
| 6,449,392 B1 | 9/2002 | Divakaran et al. | |
| 6,614,941 B1 | 9/2003 | Stone et al. | |
| 6,772,191 B1 | 8/2004 | Kurosawa et al. | |
| 6,995,805 B1* | 2/2006 | Park | 348/700 |
| 7,130,472 B2* | 10/2006 | Iizuka et al. | 382/236 |
| 7,506,071 B2 | 3/2009 | Ayres, Jr. et al. | |
| 7,616,821 B2 | 11/2009 | Ayres, Jr. et al. | |
| 7,668,965 B2 | 2/2010 | Ayres, Jr. et al. | |

(Continued)

FOREIGN PATENT DOCUMENTS

CN 1357198 7/2002

(Continued)

OTHER PUBLICATIONS

Boll, Susanne et al., "MPEG-L/MRP: Implementing Adaptive Streaming of MPEG Videos for Interactive Internet Applications," http://woodworm.cs.uml.edu/~rprice/ep/boll-demo/, Apr. 12, 2005, pp. 1-6.

(Continued)

*Primary Examiner* — Jon Chang
(74) *Attorney, Agent, or Firm* — Stephen J. Walder, Jr.; Matthew B. Talpis (57) ABSTRACT

Systems, methods and media for transitioning detecting content change in a streaming image system are disclosed. One embodiment provides a method for detecting a content change between image frames in a streaming image system. Embodiments may include selecting a change detection algorithm from a plurality of change detection algorithms and comparing a first image frame of m image stream with a second image frame of the image stream using the selected change detection algorithm. Embodiments may also include, in the event of detecting a content change between the first image frame and the second image frame, generating an indication of the content change. Further embodiments may include selecting the change detection algorithm based on a user's selection or system capabilities. Other further embodiments may include transmitting the indication of the content change.

24 Claims, 5 Drawing Sheets

U.S. PATENT DOCUMENTS

| | | |
|---|---|---|
| 2003/0161398 A1 | 8/2003 | Feder et al. |
| 2004/0089814 A1 | 5/2004 | Cheatle |
| 2004/0170392 A1 | 9/2004 | Lu et al. |
| 2007/0019866 A1* | 1/2007 | Ayres et al. .................. 382/232 |
| 2007/0022217 A1* | 1/2007 | Ayres et al. .................. 709/247 |
| 2007/0028286 A1 | 2/2007 | Greene et al. |
| 2008/0178244 A1* | 7/2008 | Ayres et al. .................. 725/116 |

FOREIGN PATENT DOCUMENTS

| | | |
|---|---|---|
| EP | 0 513 520 B1 | 11/1992 |
| EP | 0705040 B1 | 4/1996 |
| EP | 0513520 B1 | 6/1997 |
| EP | 0 938 237 A2 | 8/1999 |
| EP | 0938237 A2 | 8/1999 |
| EP | 0705040 B1 | 3/2002 |
| JP | 7084839 A | 3/1995 |
| JP | 7236139 A | 9/1995 |
| JP | 9294267 A | 11/1997 |
| JP | 11239329 A | 8/1999 |
| WO | WO93/19467 | 9/1993 |
| WO | WO 93/19467 | 9/1993 |
| WO | WO 00/79797 A1 | 12/2000 |
| WO | WO03/028237 A1 | 4/2003 |
| WO | WO 03/028237 A1 | 4/2003 |
| WO | WO 2005/050988 A1 | 6/2005 |
| WO | WO2005/050988 A1 | 6/2005 |
| WO | WO 2006/067373 A1 | 6/2006 |
| WO | WO2006/067373 A1 | 6/2006 |

OTHER PUBLICATIONS

Jun Yu et al., "An Efficient Method for Scene Cut Detection," Pattern Recognition Letters, North-Holland Publ. Amsterdam, NL., vol. 22, No. 13, Nov. 2001, pp. 1379-1391.

ISR including PCT transmittal, From the International Searching Authority, mailed Nov. 9, 2006, Applicant: International Business Machines Corporation, International Application No. PCT/EP2006/064522, pp. 5.

PCT Written Opinion of International Searching Authority, Applicant: International Business Machines Corporation, International Application No. PCT/EP2006/064522, pp. 5.

Ding, Wei, "Joint Encoder and Channel Rate Control of VBR Video over ATM Networks," IEEE Transactions on Circuits and Systems for Video Technology, vol. 7, No. 2, Apr. 1997, pp. 266-278.

Boll, Susanne et al., "MPEG-L/MRP: Implementing Adaptive Streaming of MPEG Videos for Interactive Internet Applications", http://woodworm.cs.uml.edu/~rprice/ep/boll-demo/, Apr. 12, 2005, 6 pages.

Ding, Wei, "Joint Encoder and Channel Rate Control of VBR Video over ATM Networks"IEEE Transactions on Circuits and Systems for Video Technology, vol. 7, No. 2, Apr. 1997, pp. 266-278.

Yu, Jun et al., "An Efficient Method for Scene Cut Detection", Pattern Recognton Letters, North-Holland Publ. Amsterdam, NL., vol. 22, No. 13, Nov. 2001, pp. 1379-1391.

ISR including PCT transmittal, From the International Searching Authority, Applicant: International Business Machines Corporation, International Application No. PCT/EP2006/064522, Nov. 9, 2006, 5 pages.

USPTO U.S. Appl. No. 11/184,344; Nov. 18, 2011, 2 pages.
USPTO U.S. Appl. No. 11/184,345, Nov. 18, 2011, 2 pages.
USPTO U.S. Appl. No. 11/191,576; Nov. 18, 2011, 2 pages.
USPTO U.S. Appl. No. 12/057,122; Nov. 18, 2011, 2 pages.
USPTO U.S. Appl. No. 12/573,086; Dec. 27, 2011, 2 pages.

"ISR Including PCT Transmittal & Written Opinion", From the International Searching Authority, mailed May 11, 2007, Applicant: International Business Machines Corporation, International Application No. PCT/EP2006/064229, 11 pages.

"PCT First Notice Informing the Applicant of The Communication of the International Application", (to Designated Offices which do not Apply the 30 Month Time Limit Under Article 22 {(1)), From the international Bureau, mailed Feb. 22, 2007; Applicant: International Business Machines Corporation, International Application No. PCT/EP2006/064229, 1 page.

"PCT Notification Concerning Submission or Transmittal of Priority Document", From the International Bureau, mailed Nov. 23, 2006; Applicant: International Business Machines Corporation, International Application No. PCT/EP2006/064229, 1 page.

"PCT Notification of Receipt of Record Copy", From the International Bureau, mailed Oct. 5, 2006; Applicant: International Business Machine Coproration, International Application No. PCT/EP2006/064229, 1 page.

He, Yuwen et al., "Variable Frame-Rate Video Coding Based on Global Motion Analysis", PCM 2001, LNCS 2195, pp. 426-433.

Notice of Allowance mailed Mar. 2, 2012 for U.S. Appl. No. 12/573,086, 10 pages.

* cited by examiner

DETECTING CONTENT CHANGE IN A STREAMING IMAGE SYSTEM

CROSS-REFERENCES TO RELATED APPLICATIONS

Pursuant, to 35 USC §120, this continuation application claims priority to and benefit of U.S. patent application Ser. No. 11/191,576, entitled "SYSTEMS, METHODS, AND MEDIA FOR DETECTING CONTENT CHANGE IN A STREAMING IMAGE SYSTEM", filed on Jul. 28, 2005, now abandoned the disclosure of which is incorporated herein in its entirety for all purposes.

FIELD OF INVENTION

The present invention is in the field of streaming image systems. More particularly, the present invention relates to systems, methods and media for detecting content change in a streaming image system.

BACKGROUND

The ability to stream images or other content from a server to multiple clients is a quickly-growing need. Multi-media applications that utilize streaming images continue to increase in popularity and include video games, navigation software, streaming movies or video, and the like. These applications, however, often are network-resource intensive and result in bandwidth bottlenecks and network slowdowns when content providers use them to distribute content, particularly to large numbers of users. As the popularity of streaming image applications continues to increase, the network performance problems associated with them will be exacerbated.

To reduce the impact of streaming image content on a network, content providers often compress their images before transmission. The client system must then decompress the image upon receipt before displaying the image to a user. Depending on the level of compression, network traffic can be significantly decreased by utilizing compression. One compression scheme for video images is motion-JPEG which extends the Joint Photographic Experts Group (JPEG) digital image compression standard to videos by encrypting each frame in the JPEG format. The JPEG group created the ISO/IEC International Standard 10918-1 ITU-T Recommendation T-81. (hereinafter 'JPEG') to create a decoding/encoding standard. JPEG and Motion-JPEG are lossy compression standards and thus information is lost during the compression process. Motion-JPEG provides good per-frame compression levels but some of its compression steps, such as Huffman coding, are not always necessary and can slow performance.

The Moving Pictures Experts Group (MPEG) created another family of compression standards that include MPEG-1, MPEG-2, and MPEG-4. (ISO/IEG International Standards 11172, 13818, and 14496, respectively). The MPEG working group designed the MPEG standards to work for multi-media streaming and utilize block-based motion compensated prediction (MCP) to assist in compression, For many applications, MPEG improves upon the performance of motion-JPEG. For interactive streaming image applications, however, MPEG is not optimal. MPEG requires a server to generate- multi-frame movies to achieve good compression levels, making it less useful (or interactive applications that have frame-by-frame interactions. Instead, MPEG is designed and optimized for streaming predictable content, such as movies or other videos, to client, devices.

Interactive streaming image systems provide significant challenges to content providers desiring to distribute content from a server to multiple clients. Interactive streaming image systems typically receive user input for each frame so that each image frame is customized based, on the latest user information. A map-based application, for example, might provide an image frame based on user position and heading so that the application could create an image showing the user what they would see at that position and heading. In another example, an application that displays a virtual view of what is behind an automobile may base its image oil the current position, direction, and speed of the automobile. Because each frame must be recalculated based on new information, MPEG does not provide an efficient method as it does not achieve its best compression rates when working with single frames. Similarly, motion-JPEG does not provide any advantage when used with interactive streaming image systems as it applies a compression method that may be too resource-intensive for each image frame. There is, therefore, a need for an effective mechanism for managing a streaming image system, particularly when the streaming image system is interactive.

SUMMARY

The problems identified above are in large part addressed by systems, methods and media for detecting content change in a streaming image system. One embodiment provides a method for detecting a content change between image frames in a streaming image system. Embodiments may include selecting a change detection algorithm from a plurality of change detection algorithms and comparing a first image frame of an image stream with a second image frame of the image stream using the selected change detection algorithm. Embodiments may also include, in the event of detecting a content change between the first image frame and the second image frame, generating an indication of the content change. Further embodiments may include selecting the change detection algorithm based on a user's selection or system capabilities.

Another embodiment provides a machine-accessible medium containing instructions effective, when executing in a data processing system, to cause the system to perform a series of operations for transitioning compression levels in a streaming image system, The series of operations generally includes detecting a content change between image frames in a streaming image system. Embodiments may include a series of operations for selecting a change detection algorithm from a plurality of change detection algorithms and comparing a first image frame of an image stream with a second image frame of the image stream using the selected change detection algorithm. Embodiments may also include a series of operations for, in the event of detecting a content change between the first image frame and the second image frame, generating an indication of the content change. Further embodiments may include a series of operations for selecting the change detection algorithm based on a user's selection or system capabilities.

One embodiment provides a content change detector system. The system may generally include a component interface module for receiving an image frame to be compared and a plurality of change detection modules each having an associated change detection algorithm, where the change detection modules are adapted to compare the received image frame with a previous image frame using its associated change detection algorithm. The system may also generally include an algorithm selector in communication with the component interface module to select one of the plurality of change detection algorithms for comparing the received image frame with the previous image frame.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for detecting content change in a streaming image system are disclosed. One embodiment provides a method for detecting a content change between image frames in a streaming image system. Embodiments may include selecting a change detection algorithm from a plurality of change detection algorithms and comparing a first image frame of an image stream with a second image frame of the image stream, using the selected change detection algorithm. Embodiments may also include, in the event of detecting a content change between the first image frame and the second image frame, generating an indication of the content change. Further embodiments may include selecting the change detection algorithm based on a user's selection or system capabilities. Other further embodiments may include transmitting the indication of the content change.

The disclosed system may advantageously choose between multiple change detection algorithms based on user input, system capabilities, or other factors. The disclosed system may then apply the selected change detection algorithm to successive image frames to determine if there is a difference in content between the two image frames. This may allow for a pluggable architecture that accepts any type of change detection algorithm and allows the user (or the system) to select the algorithm that best suits the situation. As new techniques are developed they may be added to the available change detection algorithms, which may provide for a flexible and adapted system.

The disclosed content change detection system may advantageously be used with a compression smoothing system. In one embodiment, upon receiving an indication from the change detection system that a change in content between successive image frames has occurred, the compression smoothing system may transition the compression level of image frames from one level to another and use a smoothing heuristic to make such changed compression levels acceptable to a user. This may allow a server to conserve bandwidth by smoothly increasing the compression level when only a lower quality image is needed and likewise smoothly decreasing the compression level when a higher quality image is needed. For an interactive image streaming system, the server may smoothly provide varying levels of compression depending on the user's activity and interaction with their environment. The disclosed content change detection system may also be useful for streaming image systems that are not interactive or any other image systems where detecting a change in content between frames is useful.

While specific embodiments will be described below with reference to particular configurations of hardware and/or software, those of skill in the art will realize that embodiments of the present invention may advantageously be implemented with other substantially equivalent hardware and/or software systems.

Figure 1:
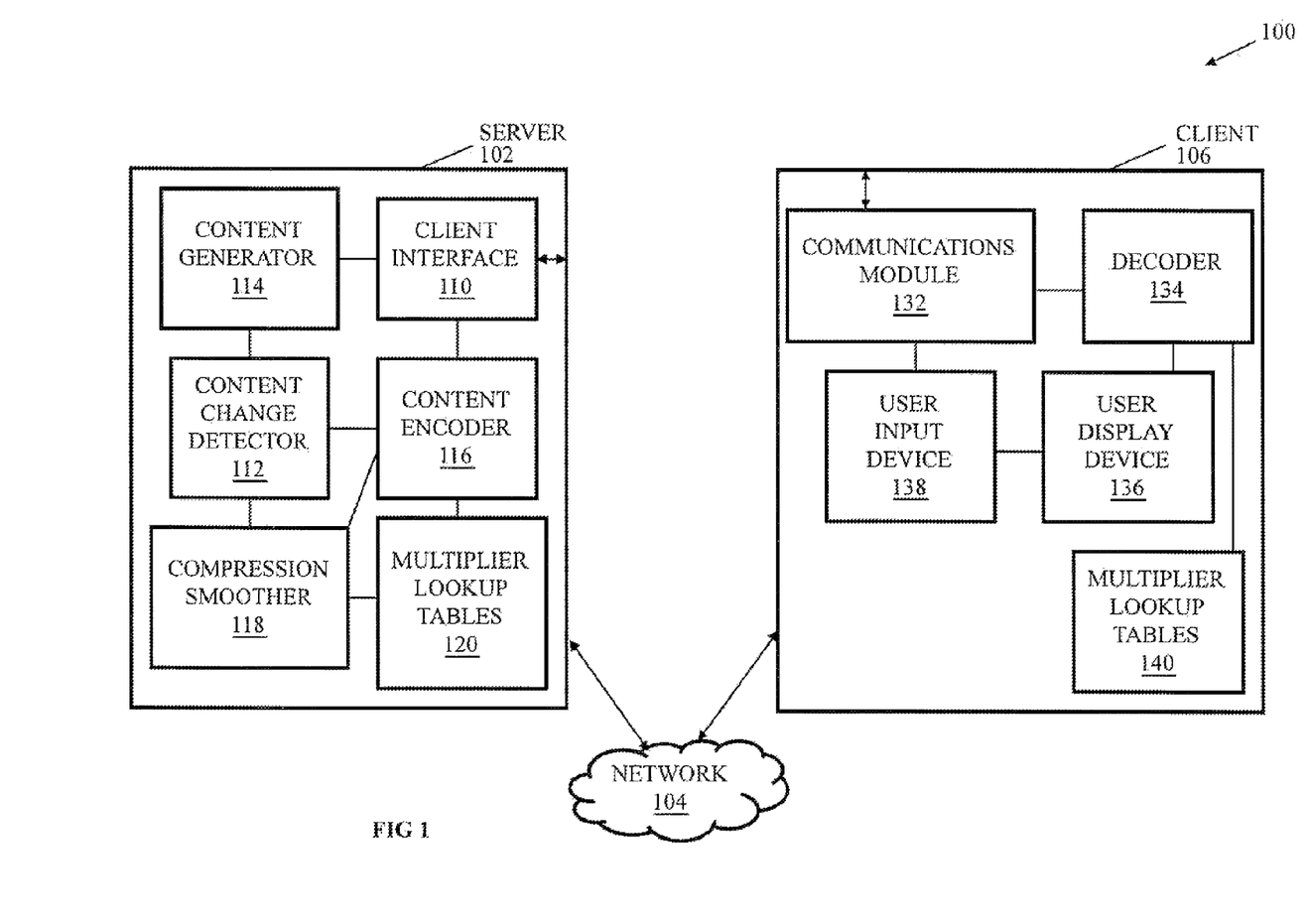
FIG. 1 depicts an environment for a system for streaming images from a server to a plurality of clients and detecting content changes in the image stream according to one embodiment.

Turning now to the drawings, FIG. 1 depicts an environment for a system for streaming images from a server to a client and detecting content changes in the image stream according to one embodiment. In the depicted embodiment, the interactive image streaming system 100 includes a server 102 and a client 106 connected via a network 104. In an interactive image steaming system, the client 106 may transmit client information to the server 102 via network 104 and the server 102 may then generate a new image frame based on the client information. After the server 102 generates the new image frame, it may then encode the image frame at a defined compression level and transmit the encoded image frame and an indication of the compression level used to encode the image frame to the client 106. The client 106 may then decode the image frame based on the compression level and display the image to a user. Using the interactive image streaming system 100, the client 106 and server 102 may thus work together to generate each image frame of a streaming image stream based on client information from each cycle. In response to detecting changes in content in the stream, the interactive image streaming system 100 may advantageously choose an appropriate level of compression (as will be described in more detail subsequently) based on the client information, the differences in content between successive images, and other information, which may result in more efficient use of bandwidth and processing. A user (or system 100) may advantageously choose a change detection algorithm to determine changed content between successive images from a list of change detection algorithms based on user preferences, system performance information, etc.

The server 102, the one or more clients 106, and any or all of their components may execute on a general or special purpose computer system such as one or more of a personal computer, workstation, server, mainframe computer, notebook or laptop computer, tablet PC, desktop computer, portable computer system, PDA, set-top box, mobile phone, wireless device, or the like. The computer system may, in one embodiment, include a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive" or "hard disk drive"), a pointing device such as a mouse, and an optional network interface adapter, all electrically connected using a motherboard or system planar to electrically connect these components together. The server 102 in one embodiment may be an International Business Machine Corporation (IBM®) eServer or similar server having one or more processors, or threads of processors, executing software and/or one or more stale machines coupled with data storage devices such as RAM, read only memory (ROM), flash memory, compact disk drives, hard drives, and the like. The client 106 in one embodiment may be a wireless device having a processor coupled with data storage devices and user input and output devices, such as a keypad and display screen. Alternatively, a wireless handheld device may act as a server 102 to stream images to a client 106 computer system via network 104.

Network 104 may be any type or combination of data communications channels, such as the Internet, an intranet, a LAN, a WAN, an Ethernet network, wireless network, etc. The Internet or other public network may be particularly useful as network 104 when a centrally located server 102 is transmitting streaming image content to a plurality of distributed clients 106 as communications between these will be facilitated. Similarly, the Internet or other public network may also suited as network 104 when a plurality of distributed servers 102 stream image content to a central client 106. Some or all of the servers 102 or clients 106 in these examples may be communicating with the Internet network 104 via a wireless network 104. Those skilled in the art will recognize, however, that the invention described herein may be implemented utilizing any type of data communications channel.

The server 102 may include components such as a communications module 110, a content change detector 112, a content generator 114, a content encoder 116, and a smoothing module 118. The communications module 110 may facilitate the server 102 in transmitting information to a client 106 via network 104 as well as receiving information from client 106 via network 104. The communications module 110 may use any type of protocol in its communications with clients 106. In one embodiment, the server 102 may receive client information from clients 106 using communications module 110 and may transmit encoded image frames and/or compression information to clients 106 using communications module 110. client information may include information identifying the client 106 or its user (or the user's preferences) as well as information relating to the image that should be streamed to the client 106, such as the user's current location or orientation. In one example, for an image streaming application that displays to a user a 3-dimensional (3-D) image based on their current position, client information may include an indication of the user's position, such as coordinates. For another application that displays to a user a virtual rendering of what they should see, client information may also include directional information such as a compass direction that provides an indication, of the direction the user is looking. Those skilled in the art will recognize that any type of information may be included as client information.

The content generator 114 may generate a new image frame based on the client information received by the communications module 110. The content generator 114, which may be or utilize a multi-media or streaming image application, may use any type of methodology to determine the contents of a new image frame. The content generator 114 may, for example, generate a new image frame based on the current location or direction of the client 106 or its user, based on the received or calculated speed of the user, based on the occurrence of an event, based on the current time* based on current weather or lighting conditions, based on the location of other clients 106 or users, or any other factors. In one exemplary embodiment, content generator 114 generates a new image frame to create a 3-D representation of the current location of the client 106. In another exemplary embodiment, content generator 114 may generate a new image frame that depicts a virtual view of what a user with client 106 would see based on their current location and direction. The content generator 114 in another embodiment may determine the velocity and direction of the client 106 based on repeated receipt of client information and may then use the determined velocity and direction to generate an appropriate new image frame. In yet another embodiment, the content generator 114 may receive or capture an image and use that image to create an image frame for client 106.

The content change detector 112 may analyze the new image frame generated by the content generator 114 and compare it with the previous image frame to determine if they differ so that the server 102 may change the compression level in response to the changed content. The content change detector 112 may use any type or combination of methodologies to determine if the content between a new image frame and a previous frame changed. In one embodiment, and as described in more detail subsequently, the content change detector 112 may select a change detection algorithm from a plurality of change detection algorithms. In one embodiment, a user of the server 102 or of the client 106 may select a change detection algorithm from a list of algorithms. In another embodiment, the content change detector 112 may select a change detection algorithm based on factors such as server 102 performance or capability, client 106 performance or capability, current network 104 conditions, or network 104 capabilities. For example, if limited computation resources were available for the content change detector 112 it may choose a less resource-intensive algorithm. Example change detection algorithms are described in relation to FIGS. 2, 4, and 5.

The content encoder 116 and smoothing module 118 may serve to, in combination or singly, determine the appropriate level of compression for the image frame to be transmitted to and encode the image frame at the selected level of compression. In one embodiment, if there is no content change between successive image frames (as determined by the content change detector 112), the content encoder 116 may desire to improve the quality of the image frame to be transmitted (and thus lower the compression level). In an interactive image streaming system, a static image (not changing between successive frames) indicates that the image from the client's point of view is stationary and image quality is thus raised in importance. In contrast, if successive images differ from each other, the client 106 point of view has motion and a lower quality of image may be utilized (with higher compression levels). When a user is viewing an image depicting motion, details in the image may be less important as details become blurred and the eye accounts for the loss in detail. When a user is viewing an image that is still, image details may be more important as the user will be more likely to see any flaws or lack of details, compression artifacts, and the like. In one embodiment, the smoothing module 118 may vary the compression level via the lossy quantization step of compression standards such as Motion-JPEG or MPEG by using multiplier lookup tables for different levels of compression as required, though those skilled in the art will recognize that the smoothing module 118 may use any type of smoothing mechanism.

The disclosed system may adapt the compression level based on the motion depicted in the image stream (as represented by the difference, or lack thereof, between successive images) based on the perceived motion of the user and/or client 106. As described in more detail in relation to FIG. 3, the content encoder 116 may use the smoothing algorithms of the smoothing module 118 to smooth the transition between different levels of compression to improve the user experience. The smoothing module 118 may determine a new level of compression for the image frame by running a smoothing heuristic to generate a multi-frame smoothing routine. When successive images vary between each frame (implying motion), the content encoder 116 may increase the compression level and reduce the bandwidth requirements without detracting from the user's viewing experience. When successive images are the same (implying a stationary client 106), the content encoder 116 may decrease the compression level and increase the quality of the image. While such action may increase the bandwidth requirements, streaming image quality for the user may be preserved. In one embodiment, the content encoder 116 may not need to transmit successive identical images and instead may transmit only an indication to the use the previous image, saving bandwidth in the stationary user situation. In an alternative embodiment, the content encoder 116 and smoothing module 118 may base the selected compression level also on the magnitude or degree of change between frames as determined by the content change detector 112 so that slight changes to the image frame do not cause large jumps in the level of compression.

In the depicted embodiment, client 106 includes a communications module 132, a decoder 134, a user display device 136, and a user input device 138. The communications module 132 of the client 106, similarly to the communications module 110 of the server 102, may facilitate the client 106 in transmitting information to server 102 via network 104 as well as in receiving information, from server 102 via network 104 using any type of protocol. In one embodiment, the client 106 may transmit client information or an indication of a user selection of a change detection algorithm to server 102 using communications module 132 and may receive encoded image frames and/or an indication of a compression level from server 102 using communications module 132. The decoder 134 may decode the encoded image received by the communications module 132, such as by decompressing the encoded image. The decoder 134 may use the indication of the compression level received by the communications module 132 to assist it in decoding the image by accessing a multiplier lookup tables associated with the compression level. After the decoder 134 processes the image, the user display device 136 may display the decoded image to the user, such as by a display screen, printed images, holograms or any other output device.

The user input device 138 may be any type of device to receive user input such as by keypad, keyboard, button, stylus, mouse, joystick, virtual reality device, voice command, or eye movement. User input may include user preferences such as a selection of a change detection algorithm, a request for a higher or lower level of compression, a request for faster screen rates, a user location or orientation, and the like. Client 106 may also include devices that determine position information such as a user location or orientation. Example devices may include a Global Positioning System (GPS) receiver or other location-determining device, electronic compass, or other devices. The position information may be a type of client information that allows the server 102 in one embodiment to customize each generated image frame based on the current position of the client 106 and/or user.

The disclosed content change detector 112 may advantageously select or provide a change detection algorithm for use in the interactive image streaming system 100. By allowing users to choose the change detection algorithm from a list or by selecting the change detection algorithm based on current system 100 capabilities or conditions, the content change detector 112 may utilize the appropriate change detection algorithm. Using the selected change detection algorithm, the content change detector 112 may facilitate operation of the content encoder 116 and smoothing module 118 to provide an effective mechanism for transitioning compression levels with little impact on a viewer in an image streaming system such as the disclosed interactive image streaming system 100.

Figure 2:
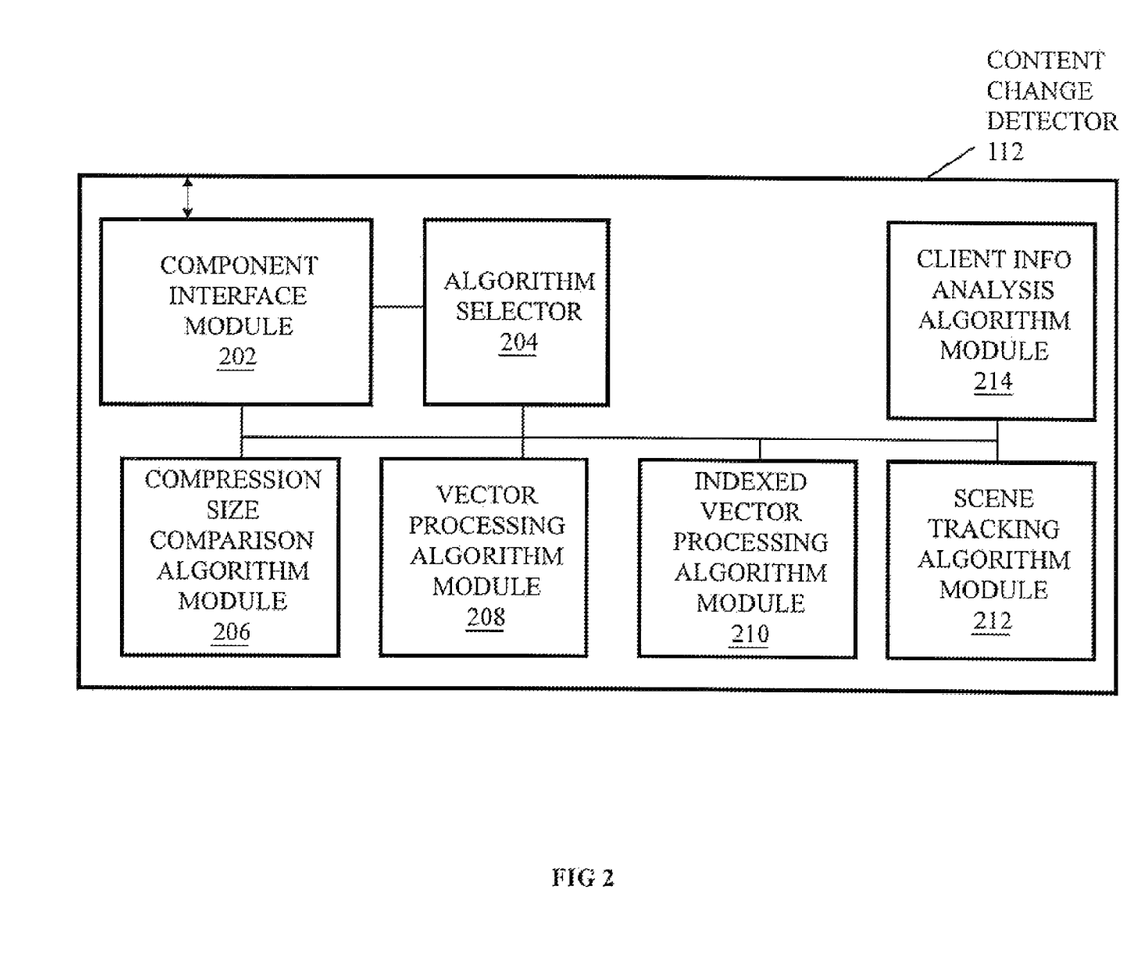
FIG. 2 depicts a content change detector of the interactive image streaming system of FIG. 1 according to one embodiment.

FIG. 2 depicts a content change detector of the interactive image streaming system of FIG. 1 according to one embodiment. In the depicted embodiment, the content change detector 112 includes a component interface module 202, an algorithm selector 204, and a plurality of change detection algorithm modules. The change detection algorithm modules may include a compression size comparison algorithm module 206, a vector processing algorithm module 208, an indexed vector processing algorithm module 210, a scene tracking algorithm module 212, and a client information analysis algorithm module 214. Those skilled in the art will recognize that the content change detector 112 may include any type, combination, and number of change detection algorithm modules. The content change detector 112 may determine if a change has occurred or it may alternatively also determine the magnitude or degree of the change between image frames. This may be useful when the magnitude or degree of change will have an impact on the chosen compression level.

The component interface module 202 may facilitate transmitting and receiving information from other components of the server 102, such as the content encoder 116, smoothing module 118, or communications module 110. The algorithm selector 204 may select the change detection algorithm for use in analyzing and compressing an image stream. As described in more detail in relation to FIG. 5, the algorithm selector 204 may use information such, as a user selection or user preferences, system performance or capabilities, default settings, and the like in making its determination.

The compression size comparison algorithm module 206 may use a comparison of the compression sizes of each image frame to determine whether a change has occurred. The algorithm may compress the image frames itself or receive compressed versions of the image frames. A non-changing compressed image frame size in an interactive system likely indicates that the client 106 is requesting the same image repeatedly and the successive image frames are the same. While this algorithm ignores the possibility that two different image frames are the same size, when compressed, in practice it may be an accurate indicator of changing image streams as two completely different consecutive image frames are very unlikely to have the same compressed image frame size. The compression size comparison algorithm module 206 may use any methodology to determine the size of the image frame, such as vector sum methodologies. This algorithm may be particular beneficial for servers 102 that are memory-constrained in capabilities more than they are processor-constrained.

The vector processing algorithm module 208 may utilize vector or statistic processing of bit maps of two successive image frames by using Boolean analysis to determine if there is a difference between vectors. To accomplish this, the vector processing algorithm module 208 may perform a Boolean sum check across each line of the image frames. This algorithm will result in a computation of changes between the images and the location of the changes. The vector processing algorithm module 208 may process the sum check relatively quickly, making this algorithm particular suited for processor-constrained environments. The indexed vector processing algorithm module 210 may perform an indexed version of the vector or statistic processing algorithm when the image frames have more regularity and speed is more critical.

The scene tracking algorithm module 212 may use scene tracking or other algorithms to attempt to predict the level at which the user of the client 106 is interacting with her environment, using the prediction to help determine whether a new image frame is the same as a previous image frame. In one embodiment, the scene tracking algorithm module 212 may use information relating to a user is interacting with an application to anticipate what the user will do next or to gauge their level of interaction. A user who is barely interacting with an application, for example, may be more likely to have a content change in successive frames of an interactive application. The scene tracking algorithm may provide a high level of performance but may also large computational requirements and be more difficult to generalize or extend to other applications.

The client information analysis algorithm module 214 may use client information to determine if a change in an image frame has occurred using any methodology. For example, the client information analysis algorithm module 214 may determine for a location-based application that if the user's location has not changed (based on the client information), the image frame to be next displayed to them need not change, either. The client information analysis algorithm may be particularly useful for certain types of applications, such as location-based applications, but may not have applicability to other types of applications.

Figure 3:
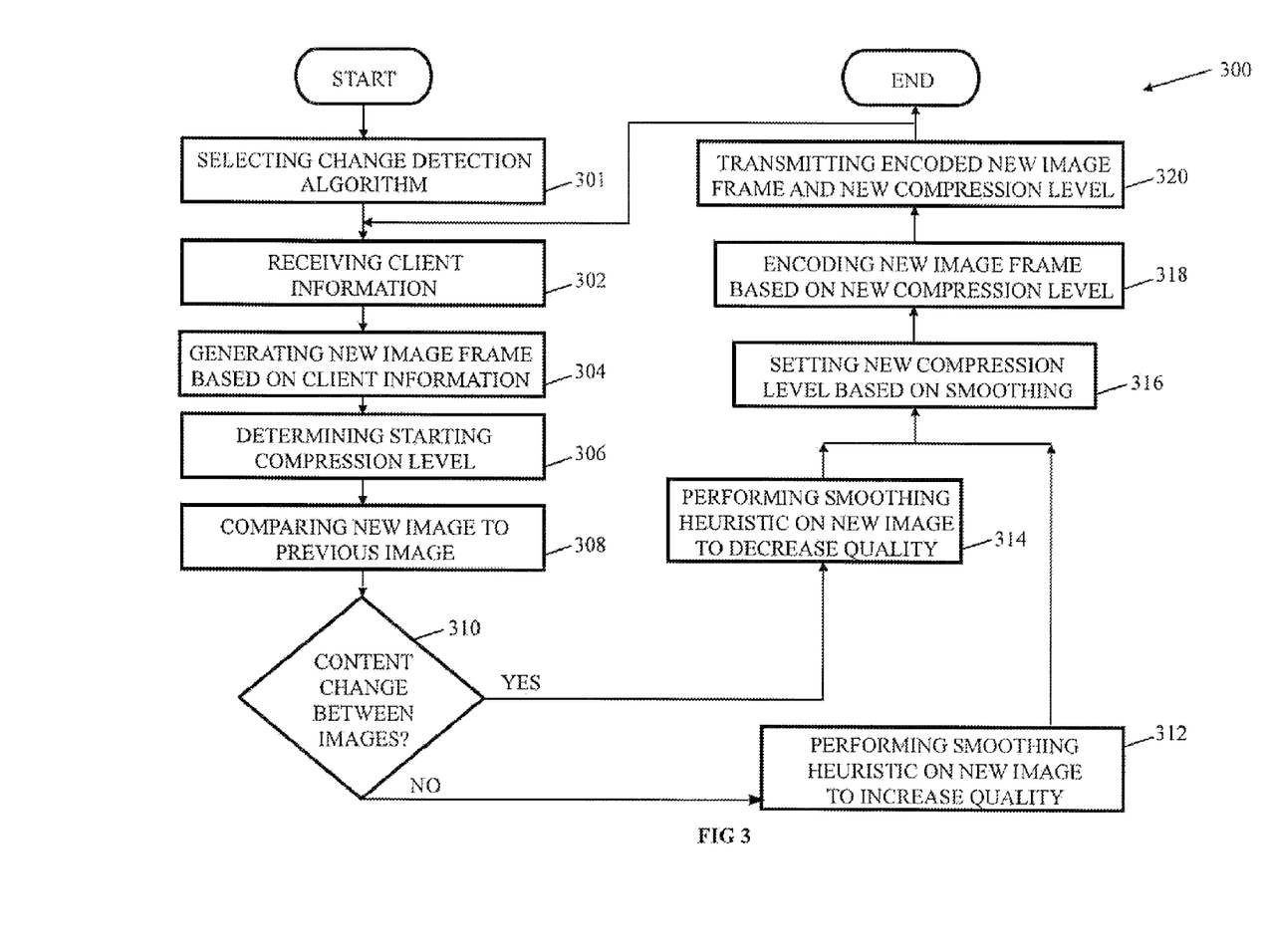
FIG. 3 depicts an example of a flow chart for generating, encoding, and transmitting a new image frame according to one embodiment.

FIG. 3 depicts an example of a flow chart for generating, encoding, and transmitting a new image frame according to one embodiment. The server 102 or any of its components, alone or in combination, may perform the method of flow chart 300. Flow chart 300 begins with element 301, selecting a change detection algorithm. At element 301, and as described in more detail in relation to FIG. 5, the content change detector 112 may select a change detection algorithm based on user input, system capabilities or loads, or other methodologies. After the content change detector 112 selects a change detection algorithm, the method of flow chart 300 continues to element 302, where the communications module 110 may receive client information from a client 106 via network 104. After receiving the client information, the content generator 112 may generate a new image frame based on the received client information at element 304. The content generator 112 may generate the new image frame using any type of algorithm depending on the application. For example, the content generator 112 may generate an image frame representing a view from the user's point of view if the application so required.

The smoothing module 118 may next determine a starting compression level for the generated image frame at element 306. In one embodiment, the smoothing module 118 may simply select the most recently-used compression level as the starting compression level. In another embodiment, the smoothing module 118 may base the starting compression level on whether the system is within a multi-frame smoothing routine. While within a multi-frame smoothing routine, the starting compression level may he based on the compression level appropriate for the current frame of the multi-frame smoothing routine. In one example, of the smoothing module 118 started a compression routine that started at a compression level of five (5) and ended at ten (10) over six (6) frames, incrementing one compression level per frame, the starting compression level for the third frame may be compression level seven (7) (5+2=7). In one embodiment, the smoothing module 118 may utilize a multi-frame smoothing routine that extends for one to two seconds in order to reduce the impact on the user. In one example, if the image stream was being transmitted at 15 frames per second a multi-frame smoothing routine of 15 to 30 frames to transition from one compression level to another may prove useful. Those skilled in the art will recognize that the smoothing module 118 may utilize other multi-frame smoothing routines.

The content change detector 112 may compare the generated new image to the previous image at element 308 after the smoothing module 118 determines the starting compression level using the change detection algorithm it selected at element 301. The results of the image comparison may include an indication that there was a change in content between the frames, an indication that there was no change in content, or an indication of the degree or amount of change. If the content change detector 112 determines at decision block 310 that the content has changed between the generated new image and the previous image frame, the method of flow chart 300 continues to element 314. At element 314, the smoothing module 118 may perform a smoothing heuristic on the new image to decrease its quality and increase the level of compression. The smoothing module 118 increases the level of compression as the content change between images indicates that the user's perspective is likely moving and that the user is thus likely to tolerate lower image quality. If the content change detector 112 determines at decision block 310 that the content has not changed between the generated new image and the previous image frame, the method of flow chart 300 continues to element 312. At element 312, the smoothing module 118 may perform a smoothing heuristic on the new image to increase its quality and decrease the level of compression. The smoothing module 118 may decrease the level of compression as the lack of content change between images indicates that the user's perspective is likely static and that the user is thus likely to require higher image quality.

The smoothing module 118 may perform its smoothing heuristic at elements 312 or 314 to change the compression level between an initial compression level and a target compression level using any methodology. In one embodiment, the smoothing module 118 may increment between the initial compression level and the target compression level (in the appropriate direction depending on whether it is increasing or decreasing) through a series of compression quality steps resulting in a multi-stage compression routine over multiple image frames. For example, the smoothing module 118 may use five levels of compression between the minimum and maximum levels of compression. For each level of compression, however, the server 102 and client 106 may each need to contain a multiplier lookup table for that level of compression. The number of compression levels requires a trade-off between memory usage at both the server 102 and client 106 and the smoothness of the heuristic and the resulting streaming images. A higher number of compression levels may result in a smoother transition between compression levels but may require additional amounts of memory, which may be problematic particularly for a client 106 that may have limited processing and memory resources. Three or more levels of compression are typically desirable for smooth transitions but one skilled in the art will recognize that lower levels are possible with potentially degraded performance. The smoothing module 118 may, in generating a multi-frame smoothing routine, use a roughly linear transition from one compression level to another or may alternatively use any other type of algorithm, such as one biased towards higher or lower compression levels.

After the smoothing module 118 has performed its smoothing heuristic, the content encoder 116 may set the new compression level for the image frame at element 316 based on the results from the smoothing module 118. With the new compression level the content encoder 116 may then encode the new image frame based on the new compression level at element 318. As described previously, the content encoder 116 may use any type of encoding algorithm to encode the new image frame. The communications module 110 may then transmit the encoded new image frame and an indication of the new compression level to the client 106 at element 320, after which the method of flow chart 300 terminates. The method of flow chart 300 may also return to element 302 to repeat the process for each frame (and may skip element 301 during normal operation).

Figure 4:
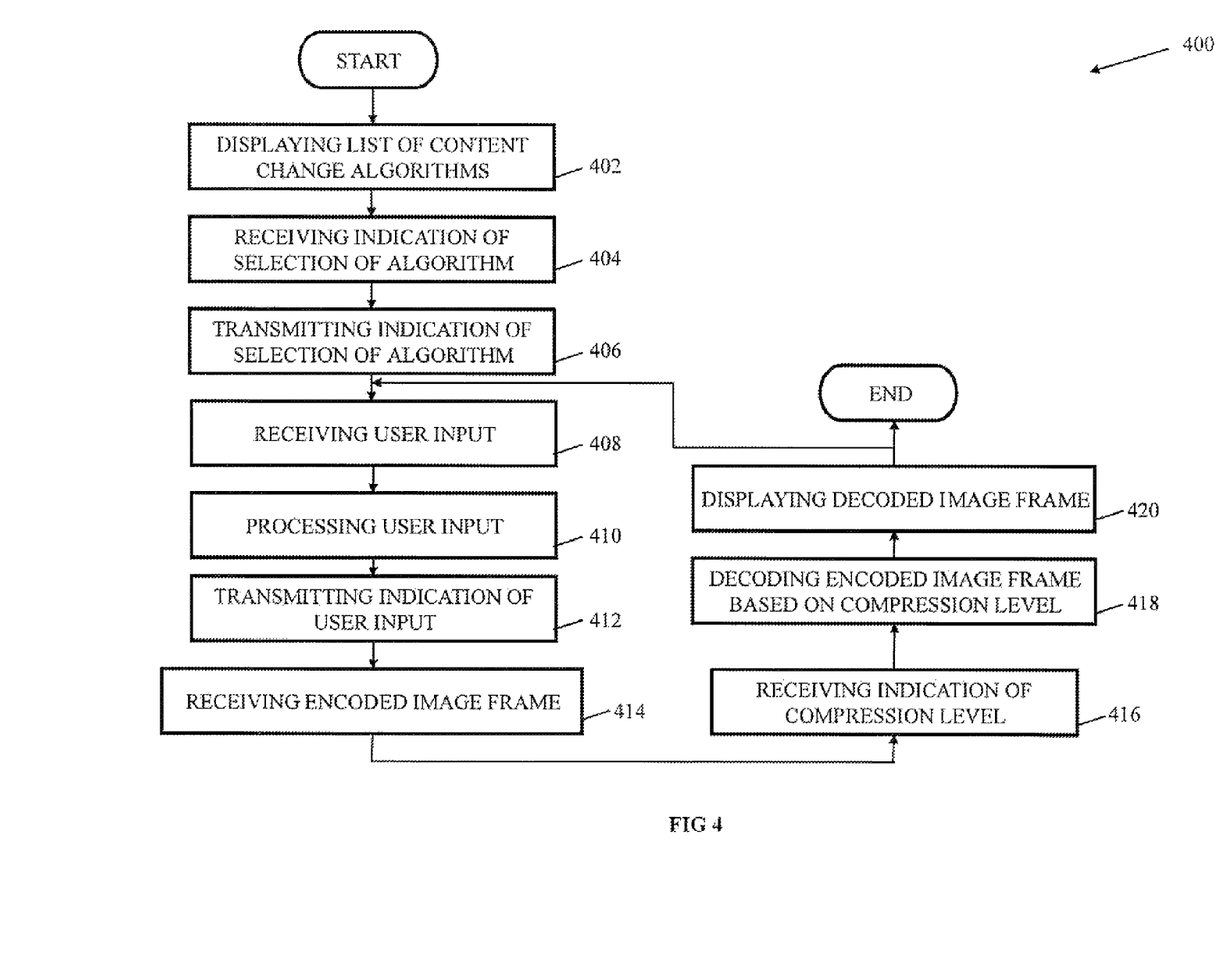
FIG. 4 depicts an example of a flow chart for receiving user input and receiving and displaying an image frame to a user according to one embodiment.

FIG. 4 depicts an example of a flow chart for receiving user input and receiving and displaying an image frame to a user according to one embodiment. The client 106 or any of its components, alone or in combination, may perform the method of flow chart 400. Flow chart 400 begins with element 402, displaying a list of change detection algorithms. At element 402, the user display device 136 may display a list of any available change detection algorithms to a user so that they may choose from the list. At element 404, the user input device 138 may receive an indication of the riser's selection, such as by a user selecting an algorithm from the displayed list. While the selection of a change detection algorithm by the user is described as the user selecting an algorithm from a list, other methodologies are also possible. The client 106 may, for example, either explicitly ask die user questions or infer preferences that are implicit from the user's behavior. The client 106 may make its determination based on direct feedback (questions or inferences based on the current stream) or indirect feedback. Indirect, feedback may include determinations based on comparisons to other aspects, such as past images or streams, related applications, similar users, or similar hardware.

Examples of explicit or implicit queries and direct or indirect feedback may provide further illumination. In one example, the client 106 may ask direct and explicit questions of the user to determine their selection by asking the user if, based upon the stream, the settings should be changed up or down. An explicit question related to the current, stream may provide an accurate portrayal of the user's preferences but does require the user to respond (and thus may impair the user's experience). In another example, the client 106 may present the user with choices of different frames or streams before streaming images showing differences between compression algorithms from which they may select. In another example, the client 106 may infer user preferences that are implicit in their behavior, such as by inferring that a user finds a particular compression level acceptable based on the user's continued viewing of the image stream. One skilled in the art will recognize that the client 106 may utilize other methodologies for determining a selected algorithm in addition to those described herein.

The communications module 132 may transmit the indication of the user's algorithm selection at element 406. Client 106 may utilize elements 402, 404, and 406 in an embodiment where the user has a choice of change detection algorithms and may execute the elements before or during the receipt of streaming image content (such as an in an interrupt routine). In one embodiment, client 106 may execute elements 402, 404, and 406 before an image stream begins so thai the elements need not be repeated for each frame of the image stream.

After optionally processing the user's selection of an algorithm, flow chart 400 continues to element 408, receiving user input relevant to the next frame. In one embodiment of element 408, the communications module 132 may receive input from a user via user input device 138, as described previously, or it may receive input from a different device such as a location determining device. The user input device 138 may optionally process the user input at element 410, such as by converting the input to another form for transmission. At element 412, the communications module 132 may next transmit an indication of the user input to the server 102 via network 104.

After transmitting an indication of the user input, the method of flow chart 400 may continue to element 414, where the communications module 132 may receive an encoded image frame from the server 102 via network 104. At element 416, the communications module 132 may also receive an indication of the compression level for the encoded image frame from the server 102 via network 104. In one embodiment, the communications module 132 may receive the encoded image frame and the indication of the compression level in the same transmission.

Using the indication of the compression level, the decoder 134 may decode the encoded image frame at element 418. The decoder 134 may use a lookup table related to the indicated compression level to perform a dequantization step of the decoding process in one embodiment. After the image frame is decoded, the user display device 136 may display the decoded image frame to the user at element 420, after which the method of flow chart 400 terminates. The method of flow chart 400 may also return to element 408 to repeat, the entire flow chart for each frame (without having to repeat the user selection of an algorithm at elements 402, 404, 406).

Figure 5:
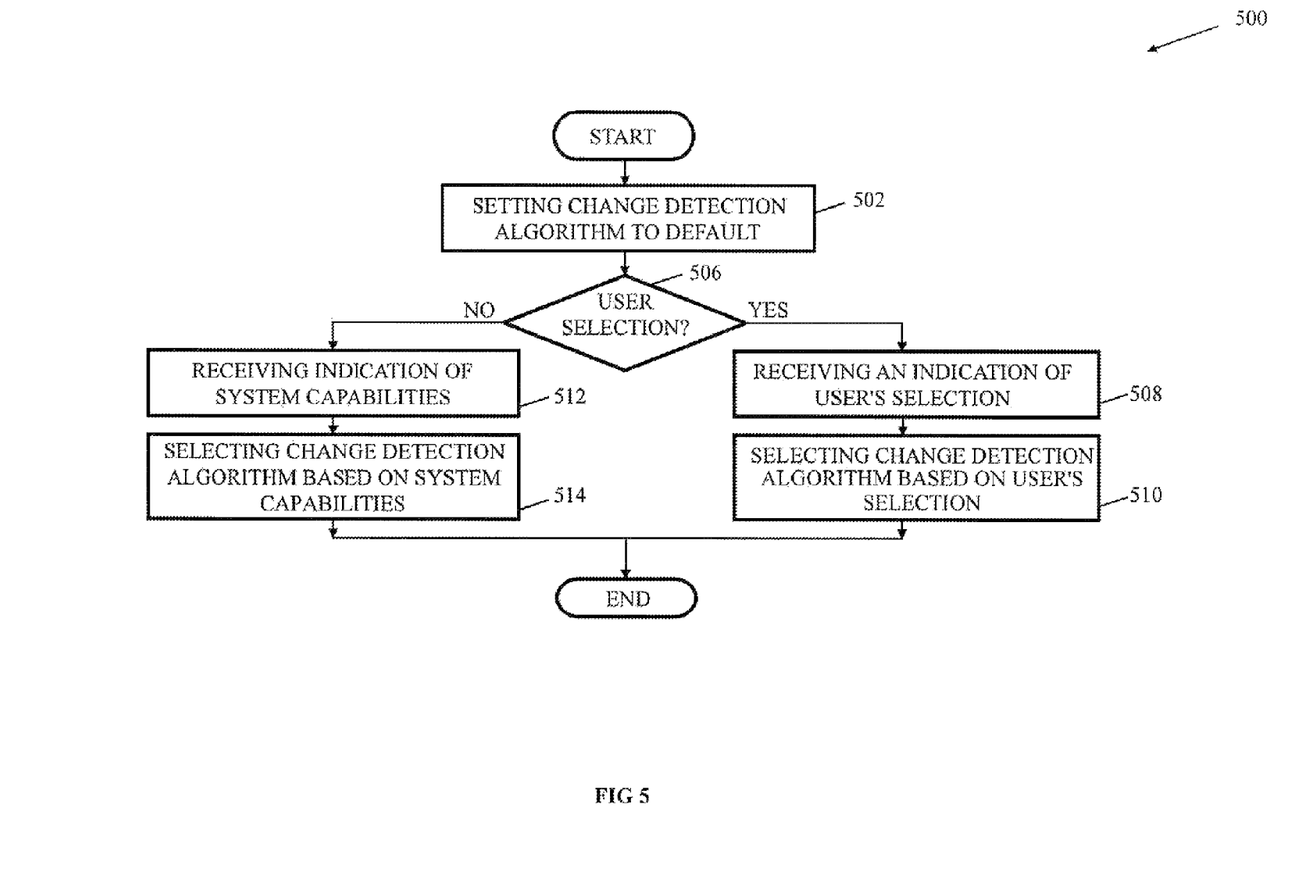
FIG. 5 depicts an example of a flow chart for selecting a change detection algorithm and comparing the content of successive image frames according to one embodiment.

FIG. 5 depicts an example of a flow chart for selecting a change detection algorithm and comparing the content, of successive image frames according to one embodiment. One or more components of the content change detector 112 may perform the method of flow chart 500 in one embodiment, such as during the execution of element 301 of FIG. 3. Flow chart 500 begins with element 502, where the algorithm selector 204 may optionally set the change detection algorithm to a default setting. The algorithm selector 204 may set the default based on user input, based on the most recently used change detection algorithm, or any other methodology.

At decision block 504, the algorithm selector 204 may determine whether a user has made a selection of a preferred change detection algorithm. If the user has made a selection, flow chart 500 continues to element 508, where the algorithm selector 204 may receive an indication of the user's selection, such as from the component interface module 202. The algorithm selector 204 may then select the change detection algorithm based on the user's selection at element 510. As described in relation to FIG. 4, the user's selection may include an indication of a user's specific selection of an algorithm, an indirect indication of the user's preference, an inferred indication of the user's preference, or other information. Alternatively, the algorithm selector 204 may ignore the user's request and leave the change detection algorithm as a default or may select it based on other factors, such as when the change detection algorithm selected by the user is unsuitable for some reason.

If the user has not made a selection (of if their selection is being overridden), flow chart 500 continues to element 512, where the algorithm selector 204 may receive an indication of system capabilities, such as from the component interface module 202. System capabilities may include performance, or capability information about the server 102, network 104, and/or client 106, such as computational or processing power, storage space, memory, current loads, bandwidth, or the like. At element 514, the algorithm selector 204 may select a change detection algorithm for the available algorithms based on the received information about system capabilities. For example, if the system capabilities indicate that server 102 processing power is limited (such as if the server 102 were a handheld wireless device), the algorithm selector 204 may select the compression size comparison algorithm as it is less processor-intensive than some other algorithms. In another example, the algorithm selector may select the vector processing algorithm in a speed-constrained environment. In another example, the algorithm selector 204 may shift processing to the server 102 if the client 106 has a large bandwidth pipeline but little computational power. Similarly, if the client 106 has little bandwidth but more computational power, the algorithm selector 204 may shift some or all of the processing to the client 106. Those skilled in the art will recognize that the algorithm selector may utilize any suitable methodology to decide between algorithms. After the algorithm selector 204 selects a change detection algorithm at element 510 or 514, as appropriate, the method of flow chart 500 terminates.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for detecting content change in a streaming image system. It is understood that the form of the invention shown and described in the detailed description and the drawings are to be taken merely as examples. It is intended that the following claims be interpreted broadly to embrace all the variations of the example embodiments disclosed.

What is claimed is:

1. A method for detecting a content change between image frames in a streaming image system, the method comprising:
   selecting by a content change detector a change detection algorithm from a plurality of change detection algorithms;
   comparing by the content change detector a first image frame of an image stream with a second image frame of the image stream using the selected change detection algorithm; and
   in the event of detecting a content change between the first image frame and the second image frame, generating by the content change detector an indication of the content change, wherein selecting a change detection algorithm from a plurality of change detection algorithms comprises:
   presenting a list of the plurality of change detection algorithms to a user; and
   receiving a user selection of the selected change detection algorithm from the list of the plurality of change detection algorithms.

2. The method of claim 1, further comprising transmitting by the content change detector the indication of the content change.

3. The method of claim 1, further comprising:
   receiving by the content change detector an indication of a user's selection of a change detection algorithm; and
   wherein selecting by the content change detector the change detection algorithm from a plurality of change detection algorithms comprises selecting by the content change detector the change detection algorithm based on the user's selection.

4. The method of claim 1, further comprising:
   receiving by the content change detector an indication of system capabilities; and
   wherein selecting by the content change detector the change detection algorithm from a plurality of change detection algorithms comprises selecting by the content change detector the change detection algorithm based on the system capabilities.

5. The method of claim 4, wherein the system capabilities comprises at least one of server performance, client performance, current network conditions, or network capabilities.

6. The method of claim 1, wherein the plurality of change detection algorithms comprises at least two of a compression size comparison algorithm, a vector processing algorithm, an indexed vector processing algorithm, or a scene tracking algorithm.

7. The method of claim 1, wherein one of the plurality of change detection algorithms is a compression size comparison algorithm, and wherein the content change detector is adapted to apply the compression size comparison by comparing a compressed first image frame and a compressed second image frame.

8. The method of claim 1, further comprising:
   dynamically adapting a compression level of image frames in the image stream based on results of the comparison of the first image frame with the second image frame using the selected change detection algorithm, wherein the compression level of the image frames is increased if there is a detected change between the first image frame and the second image frame, and wherein the compression level is decreased if there is not a detected change between the first image frame and the second image frame; and
   smoothing transitions between portions of the image stream utilizing different compression levels by applying a smoothing heuristic.

9. The method of claim 1, further comprising:
   sending an indication to use a previously transmitted image frame in response to the content change detector not detecting a content change between the first image frame and the second image frame.

10. A method for detecting a content change between image frames in a streaming image system, the method comprising:
    selecting by a content change detector a change detection algorithm from a plurality of change detection algorithms;

comparing by the content change detector a first image frame of an image stream with a second image frame of the image stream using the selected change detection algorithm; and in the event of detecting a content change between the first image frame and the second image frame, generating by the content change detector an indication of the content change, wherein selecting by the content change detector the change detection algorithm from a plurality of change detection algorithms comprises selecting by the content change detector a default change detection algorithm.

11. A computer program product for detecting a content change between image frames in a streaming image system, the computer program product comprising:

one or more computer-readable, tangible storage devices;

program instructions, stored on at least one of the one or more storage devices, to select by a content change detector a change detection algorithm from a plurality of change detection algorithms;

program instructions, stored on at least one of the one or more storage devices, to compare by the content change detector a first image frame of an image stream with a second image frame of the image stream using the selected change detection algorithm; and program instructions, stored on at least one of the one or more storage devices, in the event of detecting a content change between the first image frame and the second image frame, to generate by the content change detector an indication of the content change, wherein the program instructions to select a change detection algorithm from a plurality of change detection algorithms comprises:

program instructions to present a list of the plurality of change detection algorithms to a user; and program instructions to receive a user selection of the selected change detection algorithm from the list of the plurality of change detection algorithms.

12. The computer program product of claim 11, further comprising program instructions, stored on at least one of the one or more storage devices, to transmit by the content, change detector the indication of the content change.

13. The computer program product of claim 11, further comprising:

program instructions, stored on at least one of the one or more storage devices, to receive by the content change detector an indication of a user's selection of a change-detection algorithm; and wherein the program instructions to select by the content change detector the change detection algorithm, from a plurality of change detection algorithms selects by the content change detector the change detection algorithm, based on the user's selection.

14. The computer program product of claim 11, further comprising:

program instructions, stored on at least one of the one or more storage devices, to receive by the content change detector an indication of system capabilities; and wherein the program instructions to select by the content change detector the change detection algorithm from a plurality of change detection algorithms selects by the content change detector the change detection algorithm based on the system capabilities.

15. The computer program product of claim 11, wherein the plurality of change detection algorithms comprises at least two of a compression size comparison algorithm, a vector processing algorithm, an indexed vector processing algorithm, or a scene tracking algorithm.

16. The computer program product of claim 11, wherein one of the plurality of change detection algorithms is a compression size comparison algorithm, and wherein the content change detector is adapted to apply the compression size comparison by comparing a compressed first image frame and a compressed second image frame.

17. A computer program product for detecting a content change between image frames in a streaming image system, the computer program product comprising:

one or more computer-readable, tangible storage devices;

program instructions, stored on at least one of the one or more storage devices, to select by a content change detector a change detection algorithm from a plurality of change detection algorithms;

program instructions, stored on at least one of the one or more storage devices, to compare by the content change detector a first image frame of an image stream with a second image frame of the image stream using the selected change detection algorithm; and program instructions, stored on at least one of the one or more storage devices, in the event of detecting a content change between the first image frame and the second image frame, to generate by the content change detector an indication of the content change, wherein the program instructions to select by the content change detector the change detection algorithm from a plurality of change detection algorithms selects by the content change detector a default change detection algorithm.

18. A computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to select by a content change detector a change detection algorithm from a plurality of change detection algorithms;

program instructions, stored on at least one of the one or more storage devices for execution by at least one of the one or more processors via at least one of the one or more memories, to compare by the content change detector a first image frame of an image stream with a second image frame of the image stream using the selected change detection algorithm; and program instructions, stored on at least one of the one or more storage devices for execution by at least one of the one or more processors via at least one of the one or more memories, in the event of detecting a content change between the first image frame and the second image frame, to generate by the content change detector an indication of the content change, wherein the program instructions to select a change detection algorithm from a plurality of change detection algorithms comprises:

program instructions to present a list of the plurality of change detection algorithms to a user; and program instructions to receive a user selection of the selected change detection algorithm from the list of the plurality of change detection algorithms.

19. The system of claim 18, further comprising program instructions, stored on at least one of the one or more storage devices for execution by at least one of the one or more processors via at least one of the one or more memories, to transmit by the content, change detector the indication of the content change.

20. The system of claim 18, further comprising program instructions, stored on at least one of the one or more storage devices for execution by at least one of the one or more processors via at least one of the one or more memories, to receive by the content change detector an indication of a user's selection of a change detection algorithm; and wherein the program instructions to select by the content change detector the change detection algorithm, from a plurality of change detection algorithms selects by the content change detector the change detection algorithm, based on the user's selection.

21. The system of claim 18, further comprising program instructions, stored on at least one of the one or more storage devices for execution by at least one of the one or more processors via at least one of the one or more memories, to receive by the content change detector an indication of system capabilities; and wherein the program instructions to select by the content change detector the change detection algorithm from a plurality of change detection algorithms selects by the content change detector the change detection algorithm based on the system capabilities.

22. The system of claim 18, wherein the plurality of change detection algorithms comprises at least two of a compression size comparison algorithm, a vector processing algorithm, an indexed vector processing algorithm, or a scene tracking algorithm.

23. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to select by a content change detector a change detection algorithm from a plurality of change detection algorithms;
program instructions, stored on at least one of the one or more storage devices for execution by at least one of the one or more processors via at least one of the one or more memories, to compare by the, content change detector a first image frame of an image stream with a second image frame of the image stream using the selected change detection algorithm; and
program instructions, stored on at least one of the one or more storage devices for execution by at least one of the one or more processors via at least one of the one or more memories, in the event of detecting a content change between the first image frame and the second image frame, to generate by the content change detector an indication of the content change, wherein the program instructions to select by the content change detector the change detection algorithm from a plurality of change detection algorithms selects by the content change detector a default change detection algorithm.

24. A method for detecting a content change between image frames in a streaming image system, the method comprising:
receiving by a content change detector an indication of system capabilities;
selecting the content change detector a change detection algorithm from a plurality of change detection algorithms;
comparing by the content change detector a first image frame of an image stream with a second image frame of the image stream using the selected change detection algorithm;
in the event of detecting a content change between the first image frame and the second image frame, generating by the content change detector an indication of the content change, wherein selecting by the content change detector the change detection algorithm from a plurality of change detection algorithms comprises selecting by the content change detector the change detection algorithm based on the system capabilities, and
wherein selecting the change detection algorithm based on the system capabilities comprises determining if there are relatively limited computation resources available for the content change detector; and
in response to a determination that there are relatively limited computation resources available to the content change detector, selecting a change detection algorithm that is relatively lower resource-intensive.

* * * * *